No. 728,128. PATENTED MAY 12, 1903.
E. W. OSBURN.
KNEADING AND MIXING MACHINE.
APPLICATION FILED APR. 28, 1902.
NO MODEL.

Witnesses Inventor.
Walter B. Payne. Emory W. Osburn
G. Willard Rich. Frederick S. Church
Attorney No. 728,128. Patented May 12, 1903.

UNITED STATES PATENT OFFICE.

EMORY W. OSBURN, OF ROCHESTER, NEW YORK.

KNEADING AND MIXING MACHINE.

SPECIFICATION forming part of Letters Patent No. 728,128, dated May 12, 1903.

Application filed April 28, 1902. Serial No. 104,938. (No model.)

*To all whom it may concern:*

Be it known that I, EMORY W. OSBURN, of Rochester, in the county of Monroe and State of New York, have invented certain new and useful Improvements in Kneading and Mixing Machines; and I do hereby declare the following to be a full, clear, and exact description of the same, reference being had to the accompanying drawings, forming a part of this specification, and to the reference-numerals marked thereon.

My present invention relates to improvements in machines for mixing and kneading soft or semifluid material, and particularly for mixing and kneading dough for breadmaking; and it consists in certain improvements hereinafter described whereby the material is thoroughly kneaded and mixed and does not require further manipulation by hand, the novel features of the invention being pointed out particularly in the claims at the end of the specification.

Figure 1:
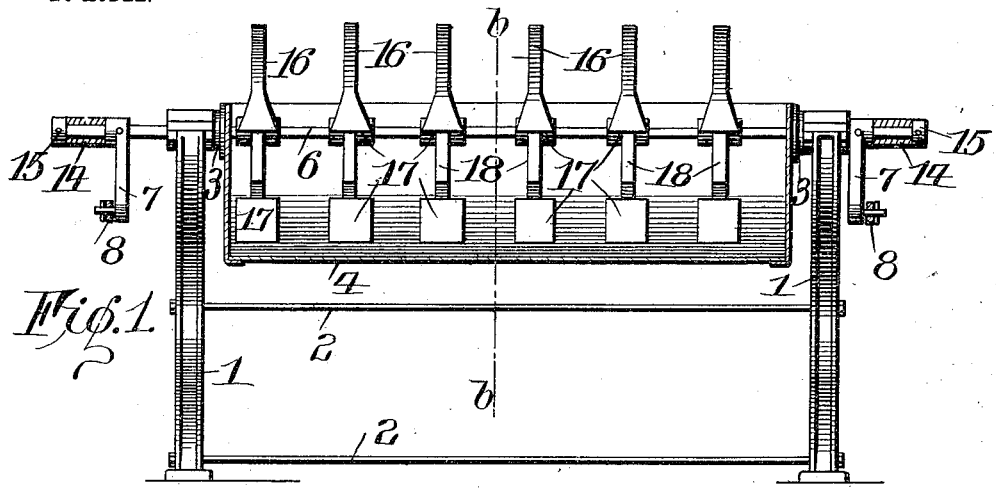
Figure 3:
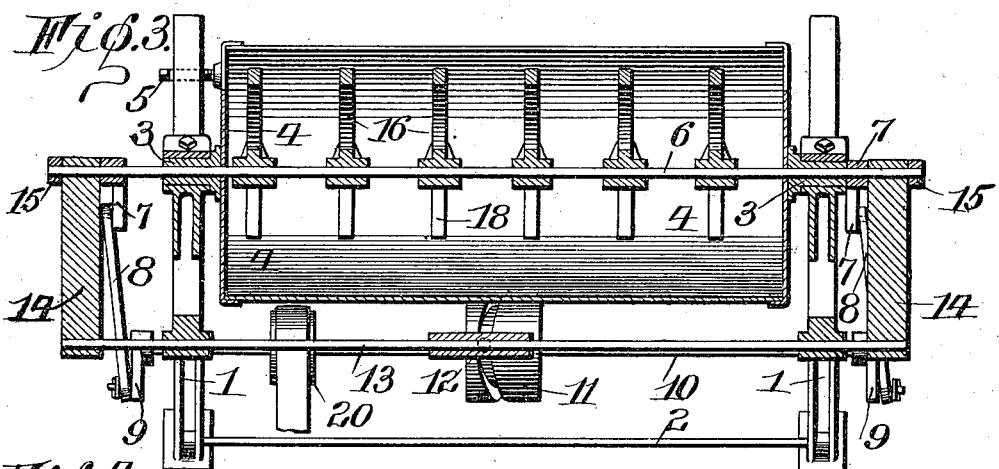
Figures 2, 4:
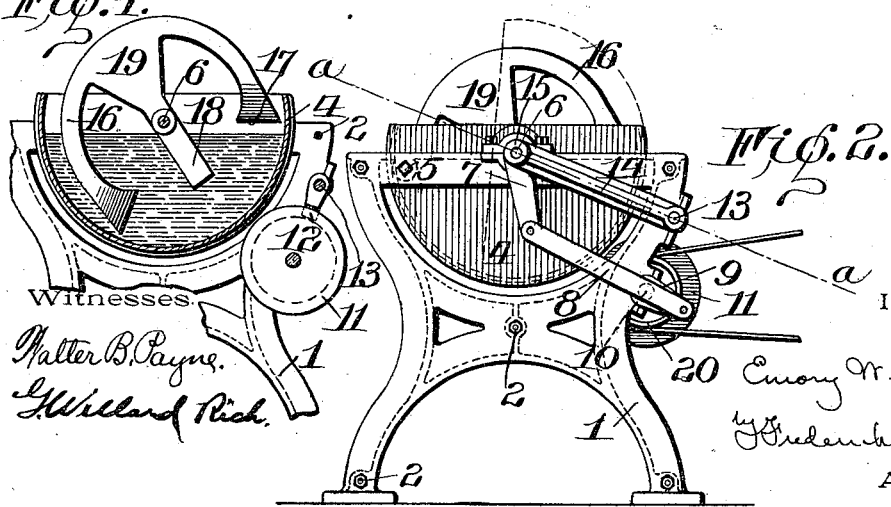

In the accompanying drawings, Figure 1 is a longitudinal sectional view through the trough or container for the dough, the side frame being shown in elevation. Fig. 2 is an end view of the machine. Fig. 3 is a sectional view on the line $a\ a$ of Fig. 2. Fig. 4 is a transverse sectional view on the line $b\ b$ of Fig. 1.

Similar reference-numerals in the several figures indicate similar parts.

The main frame of the machine embodies the standards or end frames 1, connected by suitable tie-rods 2 and having at their upper portions bearings, in which are received trunnions or sleeves 3, rigidly secured to the ends of a semicircular or segmental trough or receptacle 4, the connection between the trough and the stationary frame being such that the former may be tilted to the position shown in dotted lines in Fig. 2 to permit the removal of the contents, and in order to hold the trough in normal position with the open side uppermost I provide suitable locking devices, such as a bolt 5, between one of the side pieces and the end of the trough, or other fastening devices could be employed, as desired. The trunnions 3 on the trough are perforated axially for the free passage of the shaft 6, the ends of which in the present embodiment extend outwardly beyond the main frame and are connected loosely with a longitudinally-movable yoke, by means of which the shaft may be moved longitudinally of the trough. Secured rigidly to the shaft 6, outside of the trunnions and bearings, are cranks 7, connected by pitmen 8 with cranks 9, arranged upon the driving-shaft 10, journaled in the end frames of the machine, said shaft having upon it a driving-pulley 20 and also a cam-wheel 11, having a cam-groove in which operates a projection 12, connecting to a reciprocating yoke or frame. In the present embodiment the yoke or frame for moving the shaft 6 longitudinally embodies the shaft or rod 13, movable in bearings in the main frame and having secured to the outer ends arms 14, encircling the shaft 6 loosely and arranged between the cranks 7 and nuts or stops 15 and the ends of the shaft, as shown in Fig. 3. The pitmen 8, connecting cranks 7 and 9, are preferably loosely pivoted to the latter, so as not to interfere with the longitudinal movement of the shaft 6 while causing its oscillation. Instead of the loose connection shown any other which will permit the same result may be provided in a manner well known to skilled mechanics. The beaters or mixers operating upon the dough in the trough, of which any number desired may be employed, are connected rigidly to the shaft 6, and each embodies a central arm 19 and two segmental arms 16, connected thereto and extending from above the shaft and substantially concentric with the latter to the opposite side thereof and each having at the end the broadened faces 17. Also extending downwardly from the shaft are stirring or mixing arms 18, considerably narrower than the broadened faces of the beaters and one extending between each pair, these arms serving to break and stir up the material and prevent massing, as the faces of the beaters preferably do not reach the center.

The operation of the machine will now be readily understood. The dough or the ingredients composing it are placed in the trough or receptacle, which is locked in horizontal position, and power is applied to the driving-shaft 10 by a belt or otherwise. The rotation of this shaft through the means described not only causes the oscillation of the shaft 6, carrying the beaters, moving the broadened ends 17 of the latter in a path substantially concentric with the bottom of the trough, but the cam connection with the yoke-frame also causes a longitudinal movement of the beater-shaft to cause the beating or mixing arms to move in a spiral path also, thereby more thoroughly mixing and kneading the dough or other material. The auxiliary arms 18, arranged between the beaters, serve to break up to some extent the mass of dough between the beating or kneading arms, and thereby operate more thoroughly upon the mass of material.

It will be understood that by varying or changing the throw of the cranks and the cam which causes the longitudinal movement of the beater-shaft the regulation of the time of the oscillation and reciprocating movement of the beaters may be varied, depending somewhat upon the material operated upon. After the dough or other material has been sufficiently mixed the power-shaft is stopped and the trough or receptacle may be tilted on its trunnions to permit the removal of its contents into any suitable receptacle for further treatment.

The employment of the segmental arm extending concentrically of the shaft and provided with the broadened ends enables the dough to be thoroughly mixed by a more or less percussive action, and the resistance to the operation which would be offered by radially-extending arms is reduced, less power being required to operate the machine, and a more thorough kneading of the dough is accomplished.

I claim as my invention—

1. In a mixing-machine, the combination with a trough or receptacle having bearings therein and a shaft mounted in the bearings, of beaters secured to the shaft, means for oscillating the shaft and a separate operating device for reciprocating the shaft longitudinally in its bearings.

2. In a mixing-machine, the combination with a trough or receptacle and a shaft arranged therein, of beaters secured to the shaft embodying segmental arms operating in the trough having the opposing faces extending laterally of the shaft and means for oscillating the shaft.

3. The combination with a trough or receptacle and a shaft therein, of segmental beaters on the shaft having opposing broadened faces extending laterally of the shaft and separated by a space between them and means for oscillating the shaft to alternately move said faces toward the bottom of the receptacle.

4. The combination with a trough or receptacle, of a beater operated therein embodying a shaft and segmental arms extending concentric with said shaft having the opposing faces on their ends and an additional mixer-arm narrower than the opposing faces and arranged between them, and means for oscillating the shaft.

5. The combination with a receptacle, of an oscillatory shaft, a beater-arm connected to the shaft and extending for a portion of its length substantially concentric therewith and the faces on the ends of the arm lying in planes extending radially of the shaft.

6. The combination with a receptacle, of a shaft arranged above it and a plurality of beaters embodying segmental arms connected to the shaft, extending substantially concentric therewith, and having the broadened operating-faces and means for oscillating the shaft to alternately move said faces toward the bottom of the receptacle.

7. The combination with the receptacle, of oscillatory and reciprocating beaters operating therein each embodying segmental arms arranged concentric to the shaft and having the broadened ends.

8. The combination with the receptacle, of a shaft arranged above it and a plurality of beaters thereon operating in the receptacle, a power-shaft extending parallel with the former and connections between them for oscillating and reciprocating the beater-shaft by the continued rotation of the latter in one direction.

9. The combination with the main frame and the receptacle having the trunnions at the ends journaled in the frame and on which it may be tilted, of the shaft extending through the trunnions having the beaters thereon operating in the receptacle and means for oscillating said shaft in its bearings.

EMORY W. OSBURN.

Witnesses:
F. F. CHURCH,
G. WILLARD RICH.